(12) United States Patent
Chan et al.

(10) Patent No.: US 7,868,990 B2
(45) Date of Patent: Jan. 11, 2011

(54) LIQUID CRYSTAL PANEL HAVING A PLURALITY OF THERMAL-HARDENED SEALANT BLOCKS SURROUNDING A CLOSED LOOP UV LIGHT IRRADIATED AND THERMAL-HARDENED SEALANT

(75) Inventors: Chia-Ming Chan, Miao-Li (TW); Hung-Sheng Cho, Miao-Li (TW); Kun-Hsing Hsiao, Miao-Li (TW)

(73) Assignee: Chimel Innolux Corporation, Miao-Li County (TW)

( * ) Notice: Subject to any disclaimer, the term of this patent is extended or adjusted under 35 U.S.C. 154(b) by 89 days.

(21) Appl. No.: 12/082,777

(22) Filed: Apr. 14, 2008

(65) Prior Publication Data

US 2008/0252838 A1    Oct. 16, 2008

(30) Foreign Application Priority Data

Apr. 13, 2007    (CN) .................... 2007 1 0074012

(51) Int. Cl.
*G02F 1/1339* (2006.01)
(52) U.S. Cl. ..................................... 349/153
(58) Field of Classification Search ................. 349/153, 349/154, 190
See application file for complete search history.

(56) References Cited

U.S. PATENT DOCUMENTS

| | | | |
|---|---|---|---|
| 6,078,379 A * | 6/2000 | Nagae et al. ............... 349/155 |
| 6,222,603 B1 | 4/2001 | Sakai et al. | |
| 6,552,769 B2 | 4/2003 | Cho et al. | |
| 2003/0123017 A1 * | 7/2003 | Kim et al. ................... 349/153 |
| 2003/0137630 A1 * | 7/2003 | Niiya ......................... 349/153 |
| 2003/0160935 A1 * | 8/2003 | Lee et al. .................... 349/187 |
| 2004/0183992 A1 * | 9/2004 | Lee et al. .................... 349/187 |
| 2005/0046778 A1 * | 3/2005 | Hsiao et al. ................. 349/153 |
| 2007/0273821 A1 * | 11/2007 | Liou et al. .................. 349/153 |
| 2008/0252838 A1 * | 10/2008 | Chan et al. .................. 349/153 |

FOREIGN PATENT DOCUMENTS

KR    20050016738 A    2/2005

* cited by examiner

*Primary Examiner*—Brian M. Healy
*Assistant Examiner*—Dennis Y Kim
(74) *Attorney, Agent, or Firm*—Wei Te Chung

(57) ABSTRACT

An exemplary liquid crystal panel (20) includes a first substrate (21); a second substrate (23) parallel to the first substrate; a sealant; a liquid crystal layer (27) and a light shielding member (234). The sealant is configured for adhering the two substrates together, the sealant including a first portion (24) and a second portion (25). The liquid crystal layer is sandwiched between the two substrates. The light shielding member corresponds to the second portion of the sealant. The first portion of the sealant is adjacent to the liquid crystal layer. The second portion of the sealant surrounds the first portion of the sealant. The second portion of the sealant has stronger adhesion than the first portion. The liquid crystal panel has improved reliability.

3 Claims, 5 Drawing Sheets

LIQUID CRYSTAL PANEL HAVING A PLURALITY OF THERMAL-HARDENED SEALANT BLOCKS SURROUNDING A CLOSED LOOP UV LIGHT IRRADIATED AND THERMAL-HARDENED SEALANT

CROSS-REFERENCE TO RELATED APPLICATION

This application is related to, and claims the benefit of, a foreign priority application filed in China as Serial No. 200710074012.9 on Apr. 13, 2007. The related application is incorporated herein by reference.

FIELD OF THE INVENTION

The present invention relates to liquid crystal panels, and particularly to a liquid crystal panel having a patterned sealant and a method for fabricating the liquid crystal panel.

GENERAL BACKGROUND

A typical liquid crystal display (LCD) has the advantages of portability, low power consumption, and low radiation. LCDs have been widely used in various portable information products, such as notebooks, personal digital assistants (PDAs), video cameras and the like. Furthermore, the LCD is considered by many to have the potential to completely replace CRT (cathode ray tube) monitors and televisions. A liquid crystal panel is a major component of the LCD, and generally includes a thin film transistor (TFT) array substrate, a color filter substrate opposite to the TFT array substrate, a liquid crystal layer sandwiched between the two substrates, and a sealant for adhering the two substrates together. The two substrates and the sealant cooperatively form a liquid crystal cell, which contains the liquid crystal layer.

Liquid crystal material can be put into the liquid crystal cell through either of two popular processes. One of these processes is called injection by using the capillary phenomenon. The injection process includes the following steps: coating a sealant on a first one of the two substrates, at least one opening being provided in the sealant to allow for the passage of liquid crystal therethrough; sealing the first substrate with the second substrate to create a liquid crystal cell, and hardening the sealant to enhance the strength of adhesion between the two substrates and thereby form a liquid crystal panel preform; disposing the liquid crystal panel preform in a vacuum chamber; submerging the opening in a mass of liquid crystal, whereby liquid crystal is injected into the liquid crystal cell due to a pressure differential; and sealing the opening. Thus, a liquid crystal panel is formed.

The other process is called a one drop filling (ODF) method. The ODF process includes the following steps: coating a sealant on a first one of the two substrates to form a liquid crystal cell area; filling the liquid crystal cell area with liquid crystal by using a filling device; and sealing the second substrate to the first substrate, and hardening the sealant. Thus, a liquid crystal panel is formed.

Referring to FIG. 8, a typical liquid crystal panel 10 includes a color filter (CF) substrate 11, a thin film transistor (TFT) substrate 13 parallel to the CF substrate 11, a sealant 15, and a liquid crystal layer 17 sandwiched between the two substrates 11, 13. The sealant 15 is coated on a peripheral region of the TFT substrate 13.

Referring also to FIG. 9, after the TFT substrate 13 is sealed with the CF substrate 11 by the sealant 15, the sealant 15 is hardened by irradiation with ultraviolet (UV) light. Then, the liquid crystal panel 10 is baked in an oven during a thermal-hardening process to enhance the mechanical strength of the bond between the CF substrate 11 and the TFT substrate 13.

Experimental data indicates that the mechanical strength of the bond between the CF substrate 11 and the TFT substrate 13 varies according to different hardening processes. If the sealant 15 is hardened only by UV light, the adhesion strength is 0.5 kilogram-force (Kgf). If the sealant 15 is hardened only by the baking process, the adhesion strength is 3.0 Kgf. If the sealant 15 is hardened by the UV light together with the baking process, the adhesion strength is 2.0 Kgf. From these results, it is apparent that the adhesion strength is best when the sealant 15 is hardened only by the baking process. However, if the sealant 15 is not irradiated by UV light, the liquid crystal is liable to be contaminated by the sealant 15. Therefore, in the LCD industry of late, the sealant 15 is typically treated by UV light together with the baking process.

Some modern liquid crystal displays, such as liquid crystal display televisions, are made very large. In addition, it is desired that a ratio of a display area to a non-display area is high, and that accordingly a width of the sealant 15 is minimal. For these reasons, the adhesion strength of the sealant 15 may not be sufficient, and the liquid crystal panel 10 is liable to fracture. When this happens, the liquid crystal panel 10 may malfunction or even fail altogether.

What is needed, therefore, is a liquid crystal panel that can overcome the above-described deficiencies. What is also needed is a method for fabricating such liquid crystal panel.

SUMMARY

In one preferred embodiment, a liquid crystal panel includes a first substrate; a second substrate parallel to the first substrate; a sealant; a liquid crystal layer and a light shielding member. The sealant is configured for adhering the two substrates together, the sealant including a first portion and a second portion. The liquid crystal layer is sandwiched between the two substrates. The light shielding member corresponds to the second portion of the sealant. The first portion of the sealant is adjacent to the liquid crystal layer. The second portion of the sealant surrounds the first portion of the sealant. The second portion of the sealant has stronger adhesion strength than the first portion.

Other novel features and advantages will become more apparent from the following detailed description when taken in conjunction with the accompanying drawings. In the drawings, all the views are schematic.

DETAILED DESCRIPTION OF PREFERRED EMBODIMENTS

Figure 1:
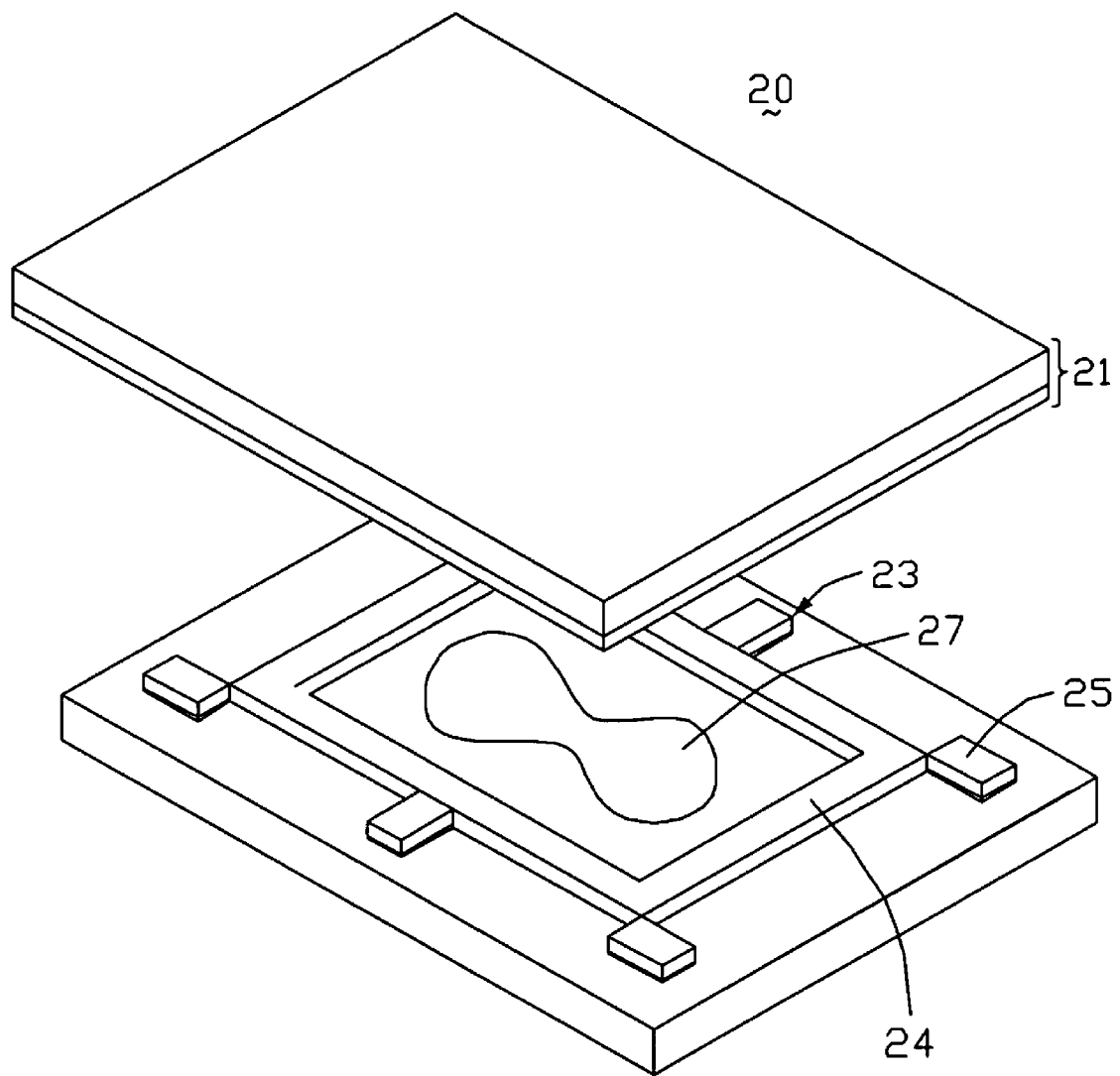
FIG. 1 is an exploded, isometric view of a liquid crystal panel according to a first embodiment of the present invention.

Reference will now be made to the drawing figures to describe various embodiments of the present invention in detail.

Referring to FIG. 1, a liquid crystal panel 20 according to a first embodiment of the present invention is shown. The liquid crystal panel 20 includes a first substrate 21, a second substrate 23, a liquid crystal layer 27, a closed sealant 24, and a plurality of auxiliary sealant blocks 25.

The first substrate 21 is disposed parallel to the second substrate 23. The closed sealant 24 is interposed between the two substrates 21, 23 to form a liquid crystal cell (not labeled) therebetween. The liquid crystal layer 27 is provided in the liquid crystal cell. The plurality of sealant blocks 25 are spaced from each other. The sealant blocks 25 are positioned around the closed sealant 24, and abut the closed sealant 24.

The closed sealant 24 and the sealant blocks 25 are made from the same material. The material is a UV-hardening type and thermal-hardening type sealant. The closed sealant 24 and the sealant blocks 25 are defined as an encapsulation sealant.

Figure 2:
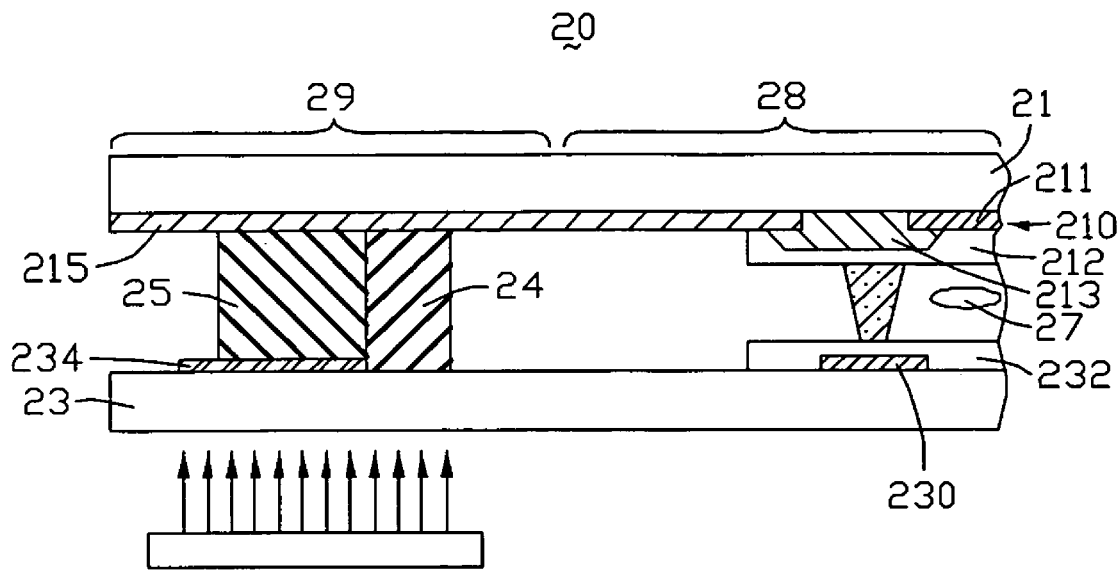
FIG. 2 is an enlarged, side cross-sectional view of part of the liquid crystal panel of FIG. 1 after the liquid crystal panel has been substantially assembled, showing irradiation of part of the liquid crystal panel with UV light.

Referring to FIG. 2, this is a schematic, enlarged, cross-sectional view of part of the liquid crystal panel 20 after the liquid crystal panel 20 has been substantially assembled. The liquid crystal panel 20 defines a display region 28, and a non-display region 29 surrounding the display region 28.

The first substrate 21 serves as a color filter substrate. A color filter layer 210 is formed on an inner surface of the first substrate 21. A first planarization layer 212 is formed on the color filter layer 210. The color filter layer 210 and the first planarization layer 212 correspond to the display region 28. A light shielding loop 215 is formed on the inner surface of the first substrate 21 corresponding to the non-display region 29.

The color filter layer 210 includes a plurality of color filter units 213 and a black matrix 211. The color filter units 213 are spaced from each other by the black matrix 211. The first planarization layer 212 is provided to protect the color filter layer 210. The light shielding loop 215 is configured for preventing light emitted from a backlight module leaking out from the non-display region 29. The light shielding loop 215 and the black matrix 211 are made from the same material, and are formed in the same fabricating process.

The second substrate 23 serves as a thin film transistor (TFT) substrate. A TFT layer 230 is formed on an inner surface of the second substrate 23. A second planarization layer 232 is formed on the TFT layer 230 for protecting the TFT layer 230. The TFT layer 230 and the second planarization layer 232 correspond to the display region 28. A plurality of metal blocks 234 are formed on the inner surface of the second substrate 23, corresponding to the non-display region 29. The sealant blocks 25 are disposed on the metal blocks 234. The metal blocks 234 can be formed along with a metal layer such as a pixel electrode of the TFT layer 230 in the same fabricating process. A total thickness of the metal block 234 and the sealant block 25 is equal to a thickness of the closed sealant 24.

An exemplary method of fabricating the liquid crystal panel 20 includes the following steps: providing a second substrate 23, which includes a TFT layer 230, a planarization layer 232, and a plurality of metal blocks 234 formed thereon; coating a closed sealant 24 on the second substrate 23 to form a liquid crystal cell, forming a plurality of sealant blocks 25 on the metal blocks 234; injecting liquid crystal material into the liquid crystal cell; adhering a first substrate 21 to the second substrate 23 through the closed sealant 24 and the sealant blocks 25, forming a liquid crystal panel 20; irradiating the liquid crystal panel 20 by UV light; and baking the liquid crystal panel 20 in an oven.

When irradiating the liquid crystal panel 20, a UV light source (not labeled) is disposed adjacent to the second substrate 23. Because the sealant blocks 25 are shielded by the metal blocks 234, only the closed sealant 24 is irradiated by the UV light. After the UV light hardening process, the liquid crystal panel 20 is hardened in an oven during a thermal-hardening process.

A group of experimental data reveals that sealant which is not irradiated by UV light has enhanced adhesion strength to the sealant which is irradiated by UV light. Compared to the conventional liquid crystal panels, the liquid crystal panel 20 further includes a plurality of sealant blocks 25, and they are not hardened by the UV light. Therefore, the liquid crystal panel 20 has improved performance in mechanical strength. The proportion of defective liquid crystal panels 20 decreases in manufacturing of the liquid crystal panel 20. What is more, the closed sealant 24 is irradiated by UV light so that the liquid crystal molecules are apt to not be contaminated.

Figure 3:
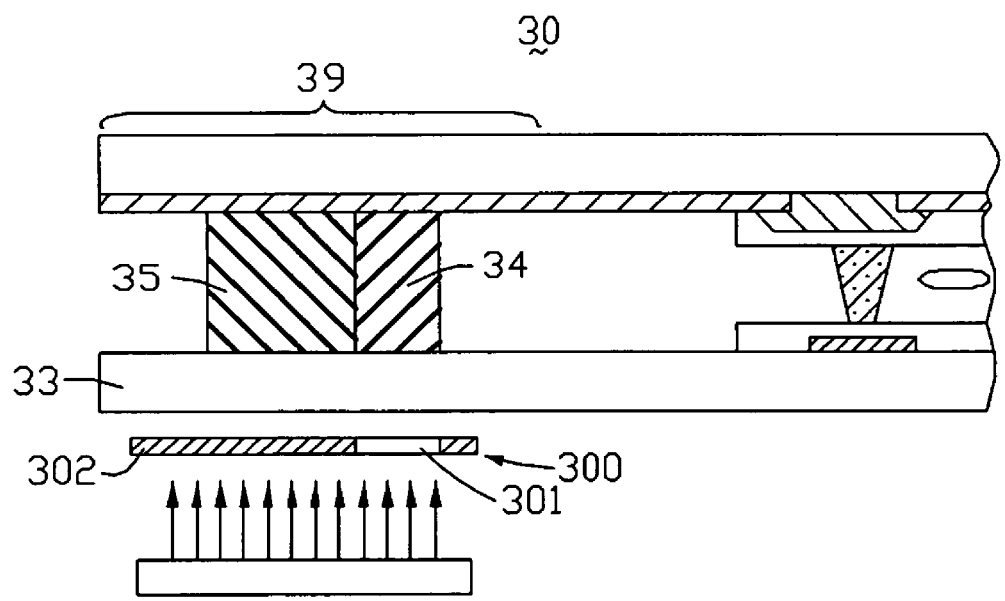
FIG. 3 is similar to FIG. 2, but showing a corresponding view in the case of a liquid crystal panel according to a second embodiment of the present invention, with the UV irradiation involving a mask.

Referring to FIG. 3, a liquid crystal panel 30 according to a second embodiment of the present invention is similar to the first embodiment. However, a plurality of metal blocks which correspond to the plurality of sealant blocks are omitted. Instead, when irradiating a non-display region 39 of the liquid crystal panel 30, a mask 300 is provided between the UV light and the liquid crystal panel 30. The mask 300 defines a light transmitting region 301 and a light shielding region 302. The light transmitting region 301 corresponds to a closed sealant 34, and the light shielding region corresponds to a plurality of auxiliary sealant blocks 35. When irradiating the liquid crystal panel 30 with the UV light, the mask 300 is disposed between a UV light source and the liquid crystal panel 30. Thus, only the closed sealant 34 is hardened by the UV light, but the sealant blocks 35 are not hardened by the UV light. The liquid crystal panel 30 has advantages similar to the liquid crystal panel 20.

Figure 4:
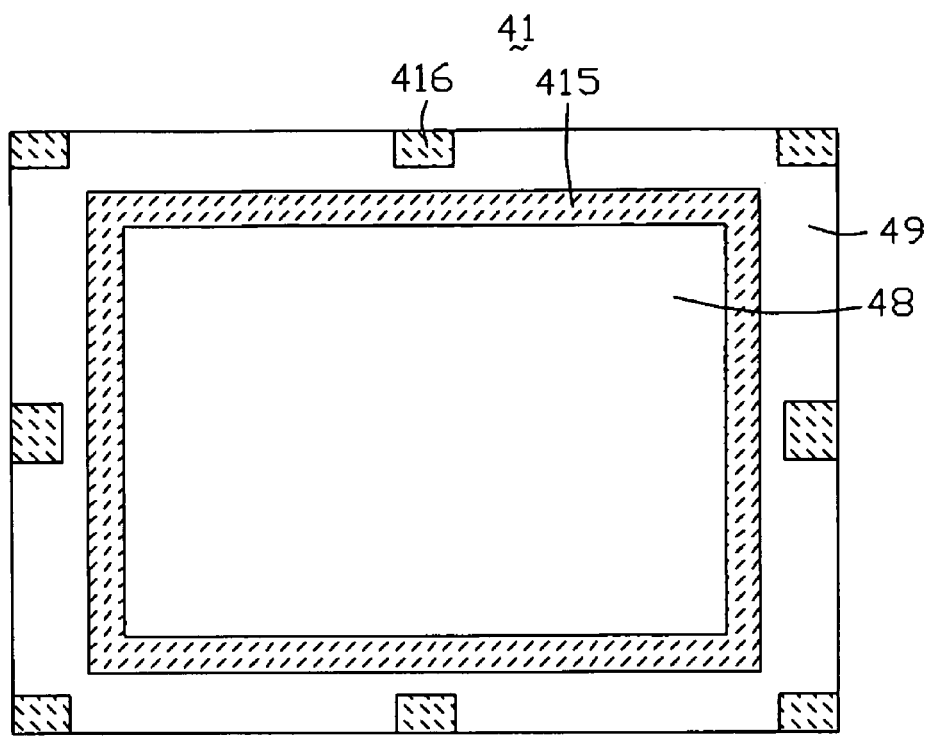
FIG. 4 is a top plan view of a first substrate of a liquid crystal panel according to a third embodiment of the present invention.
Figure 5:
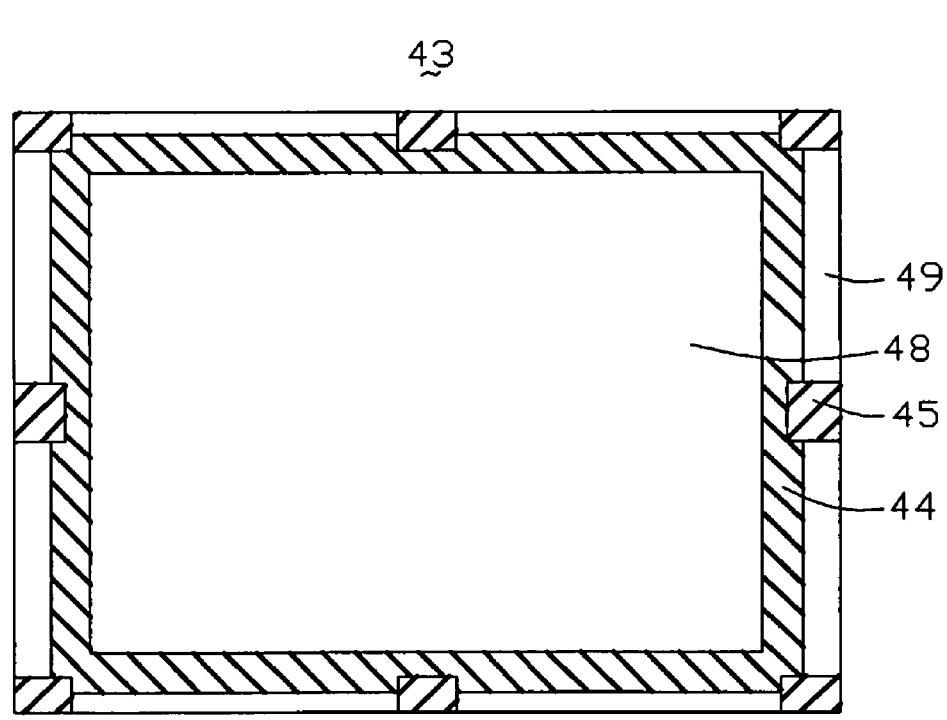
FIG. 5 is a bottom plan view of a second substrate of the liquid crystal panel according to the third embodiment of the present invention.
Figure 6:
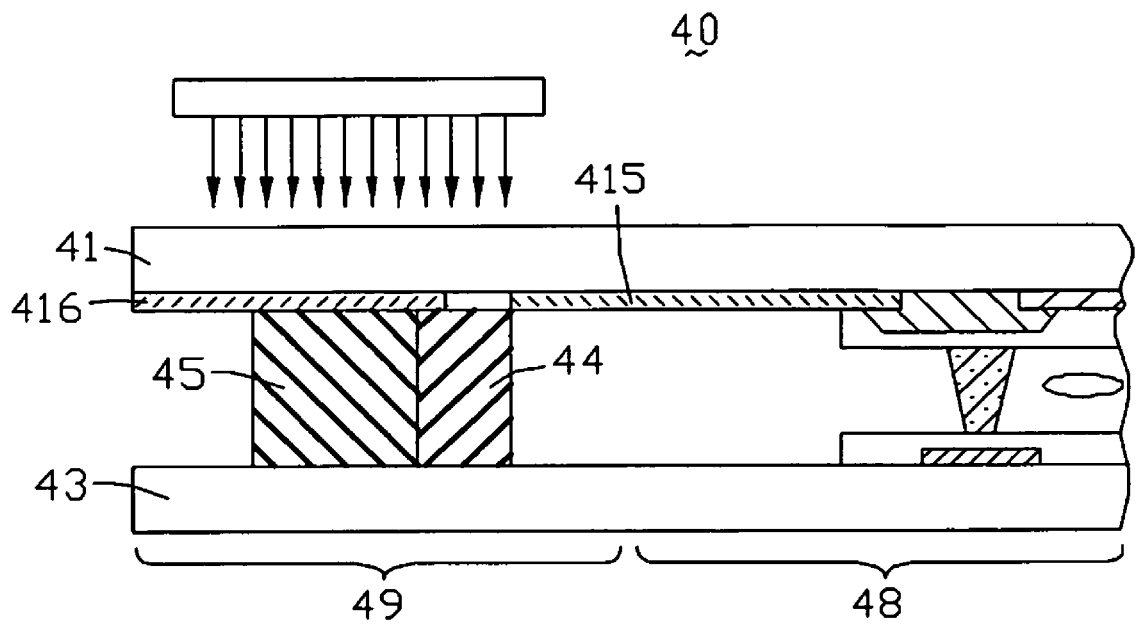
FIG. 6 is similar to FIG. 2, but showing a corresponding view in the case of the liquid crystal panel according to the third embodiment of the present invention.

Referring to FIG. 4, this is a schematic, top plan view of a first substrate of a liquid crystal panel according to a third embodiment of the present invention. Referring also to FIGS. 5 and 6, the liquid crystal panel 40 is similar to the liquid crystal panel 20. However, a rectangular frame-shaped light shielding loop 415 is formed at a junction portion of a display region 48 and a non-display portion 49 on the first substrate 41. A plurality of light shielding patches 416 are formed outside the light shielding loop 415. The light shielding patches 416 are spaced from each other, and are spaced a predetermined gap from the light shielding loop 415. The light shielding loop 415 and the light shielding patches 416 can be made of the same material, and can be simultaneously formed in a same step in a process of manufacturing the liquid crystal panel 40.

A closed sealant 44 and a plurality of auxiliary sealant blocks 45 are formed on a second substrate 43. The closed sealant 44 includes a plurality of grooves. The plurality of sealant blocks 45 are formed surrounding the closed sealant 44. The sealant blocks 45 correspond to the grooves respectively, and overlap with the closed sealant 44. The plurality of sealant blocks 45 are spaced from each other. The plurality of sealant blocks 45 correspond to the plurality of light shielding patches 416.

When irradiating the liquid crystal panel 40, a UV light source (not labeled) is disposed adjacent to the first substrate 41. Because the sealant blocks 45 are covered by the light shielding patches 416, only the closed sealant 24 is irradiated by the UV light, and the sealant blocks 45 are not irradiated by the UV light. Then, the liquid crystal panel 40 is baked in an oven during a thermal-hardening process. The liquid crystal panel 40 has advantages similar to the liquid crystal panel 20.

Figure 7:
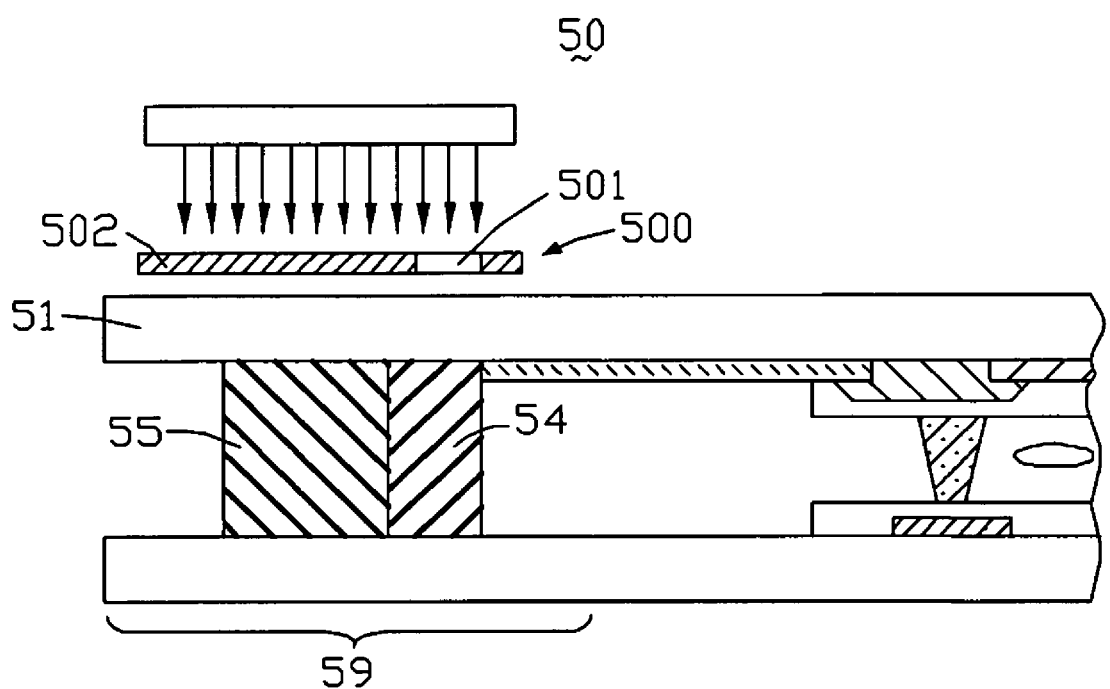
FIG. 7 is similar to FIG. 2, but showing a corresponding view in the case of a liquid crystal panel according to a fourth embodiment of the present invention, with the UV irradiation involving a mask.
Figure 8:
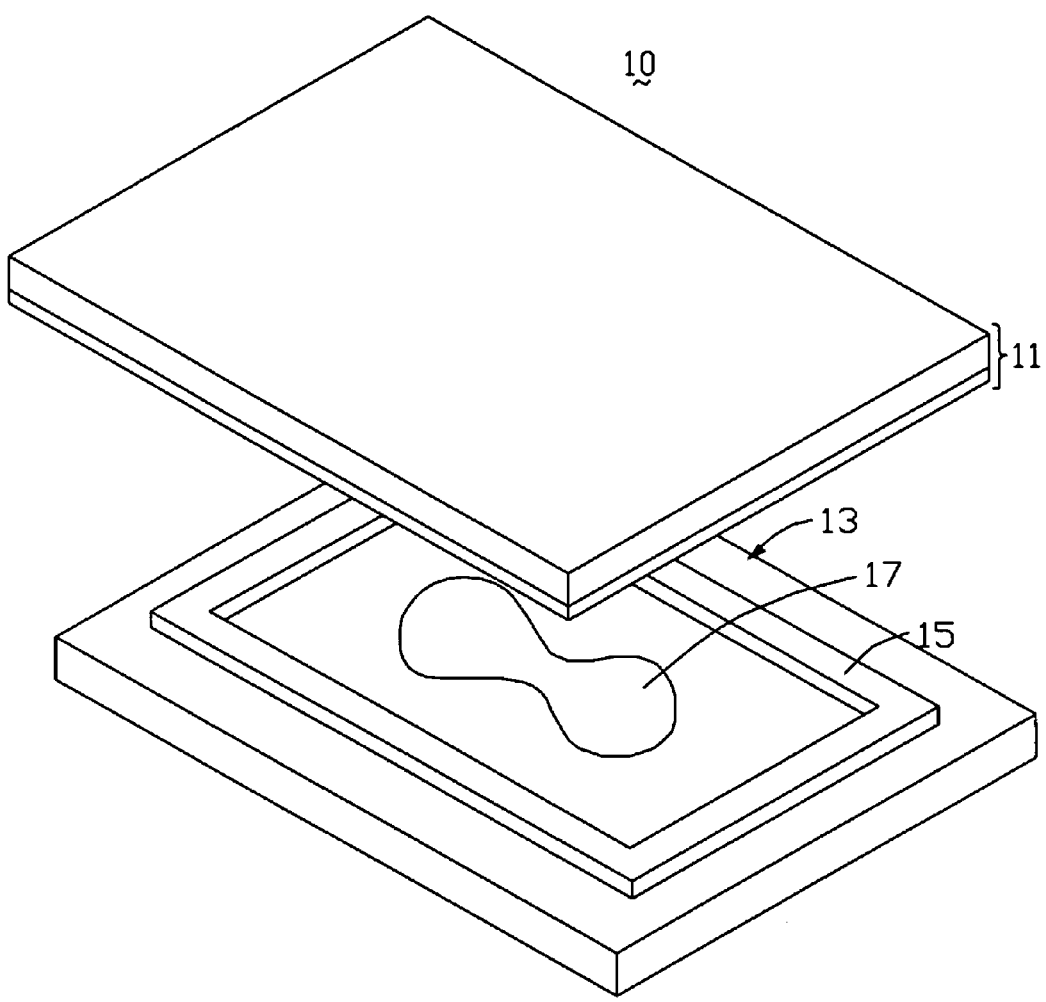
FIG. 8 is an exploded, isometric view of a conventional liquid crystal panel.
Figure 9:
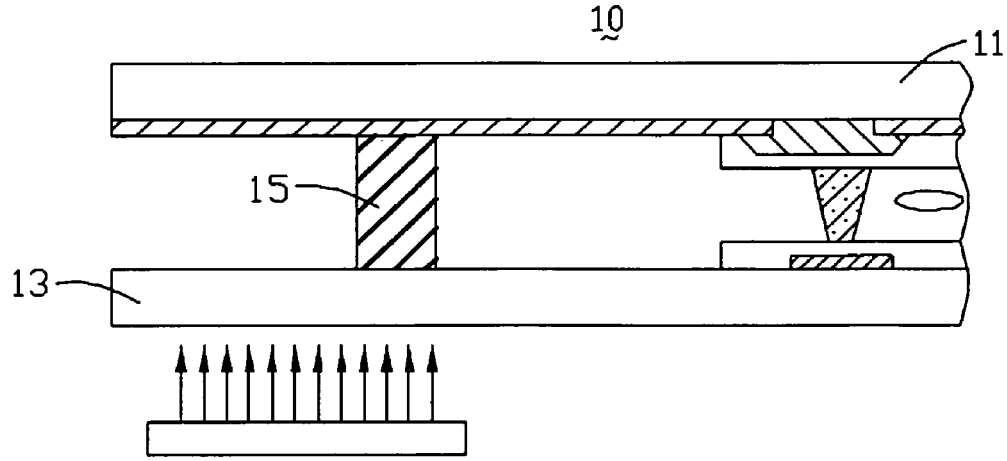
FIG. 9 is an enlarged, side cross-sectional view of part of the liquid crystal panel of FIG. 8 after the liquid crystal panel has been substantially assembled, showing irradiation of part of the liquid crystal panel with UV light.

Referring to FIG. 7, a liquid crystal panel 50 according to a fourth embodiment of the present invention is similar to the second embodiment. However, a closed sealant 54 and a plurality of auxiliary sealant blocks 55 are form directly on a first substrate 51, but not on a light shielding loop 415. Furthermore, a mask 500 is provided between a UV light source and the liquid crystal panel 50. The mask 500 is disposed adjacent to the first substrate 51. The mask 500 defines a light transmitting region 501 and a light shielding region 502. The light transmitting region 501 corresponds to the closed sealant 34, and the light shielding region 503 corresponds to the plurality of sealant blocks 55. When irradiating the liquid crystal panel 50 with the UV light, only the closed sealant 54 is hardened by the UV light, the sealant blocks 55 are not hardened. The liquid crystal panel 50 has advantages similar to the liquid crystal panel 30.

Further and/or alternative embodiments are described as follows. In one example, a sealant for adhering two substrates can be divided into a first portion and a second portion surrounding the first portion. In such case, the first portion is adjacent to a liquid crystal layer. That is, the sealant includes an inner closed sealant and an outer close sealant. When irradiating UV light, only the inner closed sealant is hardened. Then both the inner closed sealant and the outer closed sealant are hardened during a thermal-hardening process. Thus, the outer closed sealant has stronger adhesion strength than the inner close sealant, and the liquid crystal layer protected from contamination by the inner close sealant.

It is to be further understood that even though numerous characteristics and advantages of the present embodiments have been set out in the foregoing description, together with details of the structures and functions of the embodiments, the disclosure is illustrative only; and that changes may be made in detail, especially in matters of shape, size, and arrangement of parts within the principles of the invention to the full extent indicated by the broad general meaning of the terms in which the appended claims are expressed.

What is claimed is:

1. A liquid crystal panel, comprising:
a first substrate;
a second substrate parallel to the first substrate;
a liquid crystal layer sandwiched between the two substrates;
a sealant adhering the two substrates together, the sealant comprising a first portion in the form of a closed loop and a second portion comprising a plurality of sealant blocks spaced from each other, the first portion of the sealant surrounding the liquid crystal layer, and the second portion of the sealant generally surrounding the first portion of the sealant; and
a light shielding member, the light shielding member corresponding to the second portion of the sealant and exposing at least a part of the first portion of the sealant adjacent to the liquid crystal layer to light entering the liquid crystal panel from outside the liquid crystal panel, the light shielding member preventing the second portion of the sealant from being irradiated by the light while allowing said at least a part of the first portion of the sealant to be irradiated by the light, and the second portion of the sealant thereby having stronger adhesion than the first portion of the sealant;
wherein the closed loop sealant is an ultraviolet (UV) light irradiated and thermal-hardened sealant, and the sealant blocks comprise thermal-hardened sealant only.

2. The liquid crystal panel as claimed in claim 1, wherein the light shielding member comprises a plurality of metal blocks disposed on a surface of the second substrate adjacent to the liquid crystal layer, the plurality of metal blocks corresponding to the sealant blocks and blocking the sealant blocks from exposure to UV light.

3. A liquid crystal panel, comprising:
a first substrate;
a second substrate parallel to the first substrate;
a liquid crystal layer sandwiched between the two substrates;
a sealant adhering the two substrates together, the sealant comprising a first portion and a second portion, wherein the first portion of the sealant is adjacent to the liquid crystal layer, and the second portion of the sealant generally surrounds the first portion of the sealant; and
a light shielding member;
wherein the first portion of the sealant is in the form of a closed loop sealant, the second portion of the sealant comprises a plurality of sealant blocks spaced from each other, with the sealant blocks surrounding the closed loop sealant, and the light shielding member is positioned corresponding to the second portion of the sealant and exposes at least a part of the first portion of the sealant adjacent to the liquid crystal layer to light entering the liquid crystal panel from outside the liquid crystal panel, the light shielding member preventing the second portion of the sealant from being irradiated by the light while allowing said at least a part of the first portion of the sealant to be irradiated by the light, the first portion of the sealant being an ultraviolet (UV) light irradiated and thermal-hardened sealant, and the second portion of the sealant being only a thermal-hardened sealant, the second portion of the sealant thereby having stronger adhesion than the first portion of the sealant.

* * * * *

UNITED STATES PATENT AND TRADEMARK OFFICE
CERTIFICATE OF CORRECTION

PATENT NO. : 7,868,990 B2
APPLICATION NO. : 12/082777
DATED : January 11, 2011
INVENTOR(S) : Chia-Ming Chan, Hung-Sheng Cho and Kun-Hsing Hsiao It is certified that error appears in the above-identified patent and that said Letters Patent is hereby corrected as shown below:

On the Title Page
Please replace Item (73) regarding "Assignees" with the following:

Item (73) Assignees: Chimei Innolux Corporation, Miao-Li County (TW).

Signed and Sealed this
Fourteenth Day of June, 2011

David J. Kappos
*Director of the United States Patent and Trademark Office*